United States Patent
Gövert

(10) Patent No.: US 10,343,203 B2
(45) Date of Patent: Jul. 9, 2019

(54) METHOD FOR PRODUCING A CONNECTING ELEMENT FOR TRANSMITTING ROTATIONAL MOVEMENTS

(71) Applicant: THYSSENKRUPP STEEL EUROPE AG, Duisburg (DE)

(72) Inventor: Michael Gövert, Monheim (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 676 days.

(21) Appl. No.: 14/412,591

(22) PCT Filed: Jun. 6, 2013

(86) PCT No.: PCT/EP2013/061686
§ 371 (c)(1),
(2) Date: Jan. 2, 2015

(87) PCT Pub. No.: WO2014/005789
PCT Pub. Date: Jan. 9, 2014

(65) Prior Publication Data
US 2015/0184698 A1 Jul. 2, 2015

(30) Foreign Application Priority Data
Jul. 4, 2012 (DE) .................. 10 2012 105 958

(51) Int. Cl.
*B21D 22/16* (2006.01)
*F16D 3/223* (2011.01)
(Continued)

(52) U.S. Cl.
CPC ............ *B21D 22/16* (2013.01); *B21D 53/28* (2013.01); *B21D 53/84* (2013.01); *B21H 5/025* (2013.01);
(Continued)

(58) Field of Classification Search
CPC ........ B21D 22/16; B21D 53/28; B21D 53/84; B21H 5/025; F16D 1/076; F16D 3/16;
(Continued)

(56) References Cited

U.S. PATENT DOCUMENTS 5,052,979 A * 10/1991 Welschof ............ B60B 27/0005
464/906
5,221,233 A * 6/1993 Jacob .................... F16D 3/2237
464/145

(Continued)

FOREIGN PATENT DOCUMENTS

CN 1091681 A 9/1994
DE 4105757 A 9/1992
(Continued)

OTHER PUBLICATIONS

Translation of DE 197 13 440. Koestermeier. Rotation-symmetrical workpiece production method. Nov. 27, 1997.*
(Continued)

*Primary Examiner* — Josh Skroupa
(74) *Attorney, Agent, or Firm* — RMCK Law Group PLC

(57) ABSTRACT

A method may be used to produce a connecting element for transmitting rotational movements, wherein the connecting element has a joint outer part or flange and a connecting pin. The object of providing a method for producing a connecting element with a joint outer part or flange and a connecting pin, with which method weight-optimized connecting elements can be produced in a simple manner, is achieved in that a round-plate-like or tubular blank is deformed by flow forming or flow turning to form the connecting element.

3 Claims, 3 Drawing Sheets

(51) Int. Cl.
  B21D 53/28 (2006.01)
  B21D 53/84 (2006.01)
  B21H 5/02 (2006.01)
  F16D 1/076 (2006.01)

(52) U.S. Cl.
  CPC .............. *F16D 3/223* (2013.01); *F16D 1/076* (2013.01); *F16D 2003/22326* (2013.01); *F16D 2250/0023* (2013.01); *F16D 2300/18* (2013.01); *Y10S 464/906* (2013.01); *Y10T 29/49696* (2015.01)

(58) Field of Classification Search
  CPC .............. F16D 3/223; F16D 2250/0023; F16D 2300/18; F16D 2300/22326; F16D 2003/22326; Y10T 29/49696; Y10T 403/7026
  USPC ................. 464/139–146, 906; 403/359.1; 29/898.07
  See application file for complete search history.

(56) References Cited

U.S. PATENT DOCUMENTS

| | | | | |
|---|---|---|---|---|
| 5,433,668 | A * | 7/1995 | Harz | F16D 3/2237 464/145 |
| 5,451,185 | A * | 9/1995 | Krude | F16D 3/2237 464/145 |
| 5,509,856 | A * | 4/1996 | Welschof | F16D 3/2237 464/145 |
| 5,609,527 | A * | 3/1997 | Fuerstenau | F16D 3/223 464/145 |
| 5,616,081 | A * | 4/1997 | Krude | F16D 3/2237 464/145 |
| 5,711,174 | A * | 1/1998 | Dohi | B21D 53/28 72/83 |
| 6,022,275 | A * | 2/2000 | Bertetti | B60B 27/0005 464/906 |
| 6,026,666 | A | 2/2000 | Zimmermann | |
| 6,152,825 | A * | 11/2000 | Doell | F16D 3/223 464/906 |
| 6,206,785 | B1 * | 3/2001 | Thomas | F16D 3/223 403/141 |
| 6,398,657 | B2 * | 6/2002 | Krude | F16D 3/2237 464/145 |
| 6,508,094 | B1 * | 1/2003 | Gotou | B21D 22/16 72/110 |
| 6,709,337 | B2 * | 3/2004 | Krude | F16D 3/223 464/145 |
| 7,004,842 | B2 * | 2/2006 | Fairchild | F16D 3/22 464/140 |
| 7,152,446 | B2 * | 12/2006 | Wada | B21D 53/28 29/893.32 |
| 7,175,531 | B2 * | 2/2007 | Schaaf | F16D 3/2237 464/145 |
| 7,824,272 | B2 * | 11/2010 | Cermak | F16D 3/2237 464/178 |
| 7,850,530 | B2 * | 12/2010 | Cermak | B60B 27/00 464/178 |
| 8,052,537 | B2 * | 11/2011 | Niebling | F16D 3/2237 464/178 |

FOREIGN PATENT DOCUMENTS

| | | | | |
|---|---|---|---|---|
| DE | 4218092 | C1 | 6/1993 | |
| DE | 4213285 | C2 | 5/1996 | |
| DE | 19713440 | A1 * | 11/1997 | .............. B21D 22/16 |
| DE | 19722359 | A1 | 12/1998 | |
| DE | 10156086 | A1 | 6/2003 | |
| DE | 102005022801 | A1 | 11/2006 | |
| EP | 0568779 | A1 | 11/1993 | |
| JP | H10137882 | A | 5/1998 | |
| JP | 2011179619 | A | 9/2011 | |
| WO | 2008114623 | A | 9/2008 | |
| WO | 2010058780 | A | 5/2010 | |

OTHER PUBLICATIONS

Translation of DE 42 13 285. Kugler. Mfr. tool for coupling system sleeve parts—incorporates built up solid inner die and outer shaping tool with wheels or rollers. Oct. 28, 1993.*
"Leifeld CNC Flow Forming Machines." Leifeld. Dec. 6, 2008, [online], [retrieved on Aug. 14, 2018]. Retrieved from the Internet <URL : https://web.archive.org/web/20080612135259/http://www.leifeldspinning.com/flow_forming_machines/flow_forming_machines.htm>.*
Chinese Office Action for counterpart Chinese patent applicaiton No. CN 201380035276.7.
English translation of Abstract of DE 4218092 C1.
German Language International Search Report for International patent application No. PCT/EP2013/061686; dated Nov. 4, 2013.
English Translation of International Search Report for International patent application No. PCT/EP2013/061686; dated Nov. 4, 2013.
English Translation of abstract of DE 19722359 (A1).
English Translation of abstract of DE 19713440 (A1).
English Translation of abstract of EP 0568779 (A1).
English Translation of abstract of DE 102005022801 (A1).
English Translation of abstract of DE 10156086 (A1).
English Translation of abstract of DE 4213285 (C2).

* cited by examiner

METHOD FOR PRODUCING A CONNECTING ELEMENT FOR TRANSMITTING ROTATIONAL MOVEMENTS

CROSS REFERENCE TO RELATED APPLICATIONS

This application is a U.S. National Stage Entry of International Patent Application Serial Number PCT/EP2013/061686, filed Jun. 6, 2013, which claims priority to German patent application no. 102012105958.6, filed Jul. 4, 2012.

FIELD

The invention relates to a method for producing a connecting element for transmitting rotational movements, wherein the connecting element has a joint outer part or flange and a connecting pin. The invention also relates to a connecting element with a joint outer part or a flange and a connecting pin.

BACKGROUND

Connecting elements, such as, for example, connecting pins, are required in order to connect rotating shafts to one another. Connecting pins of the type in question are used for constant velocity joints, tripod joints and also universal joints in order to connect rotary spindles, which do not run parallel, to each other in a form-fitting manner such that the rotational movements can be transmitted from one spindle to the other. Connecting pins are customarily produced from steel or another metal. Connecting pins which are manufactured together with a joint outer part from a blank are also referred to as pivot pins. The connecting pin serves to connect joints or articulated shafts on one side, for example, to a gearing or a drive. The connecting pin comprises, for example, an inner and/or outer toothing, a circlip groove and/or a thread. Furthermore, a connecting or pivot pin used on the transmission side can have a running surface of a shaft sealing ring and oil grooves. The joint outer part has what are referred to as ball and cage raceways, in which the balls arranged in the interior can change the relative position thereof with respect to the joint outer part. This makes it possible to deflect the rotational movement in a different direction via the translatory movement of the balls within the joint outer part. Furthermore, further functional elements, such as, for example, an ABS ring can be provided. It has now been determined that the pivot pins which have hitherto been used and are customarily provided with a connecting pin made from solid material can be optimized in respect of the weight thereof. Furthermore, the pivot pins are generally produced from blanks by an extrusion process which is relatively complicated. In particular, functional surfaces, for example the ball raceways and/or cage raceways, partially have to be produced or manufactured with a material-removing operation. This results in a relatively large number of manufacturing steps. It is a further disadvantage that a minimum strip thickness has to be ensured for the extrusion process. A material-removing reduction of the wall thickness is too costly. As a result, pivot pins have a considerable weight saving potential.

German patent DE 42 13 285 C2 discloses a method for producing a joint outer part of a pivot pin of a spherical rotary joint or a tripod joint, in which, from a billet which is preshaped by deep drawing or from a pre-shaped tubular body, the regions of the ball or roller raceways are formed exclusively in the respective edge regions of the ball and roller raceways radially via roller external tools. Although the deep drawing process or the method for producing the joint outer part from a tubular body basically permits a reduction in the wall thickness, the latter cannot be configured to suit the load, since said wall thickness remains substantially constant during the deep drawing process. Furthermore, the joint outer part still has to be connected in an integrally bonded manner to the connecting pin in a further working step. Overall, the production of the pivot pin is therefore likewise complicated.

SUMMARY

Taking this as the starting point, the present invention is based on the object of providing a method for producing a connecting element with a joint outer part or flange and a connecting pin, with which method weight-optimized connecting elements can be produced in a simple manner. Furthermore, the present invention is based on the object of proposing a correspondingly weight-optimized connecting element.

BRIEF DESCRIPTION OF THE DRAWINGS

The present disclosure is described in detail below with reference to the attached drawing figure, wherein.

DETAILED DESCRIPTION

Figure 1:
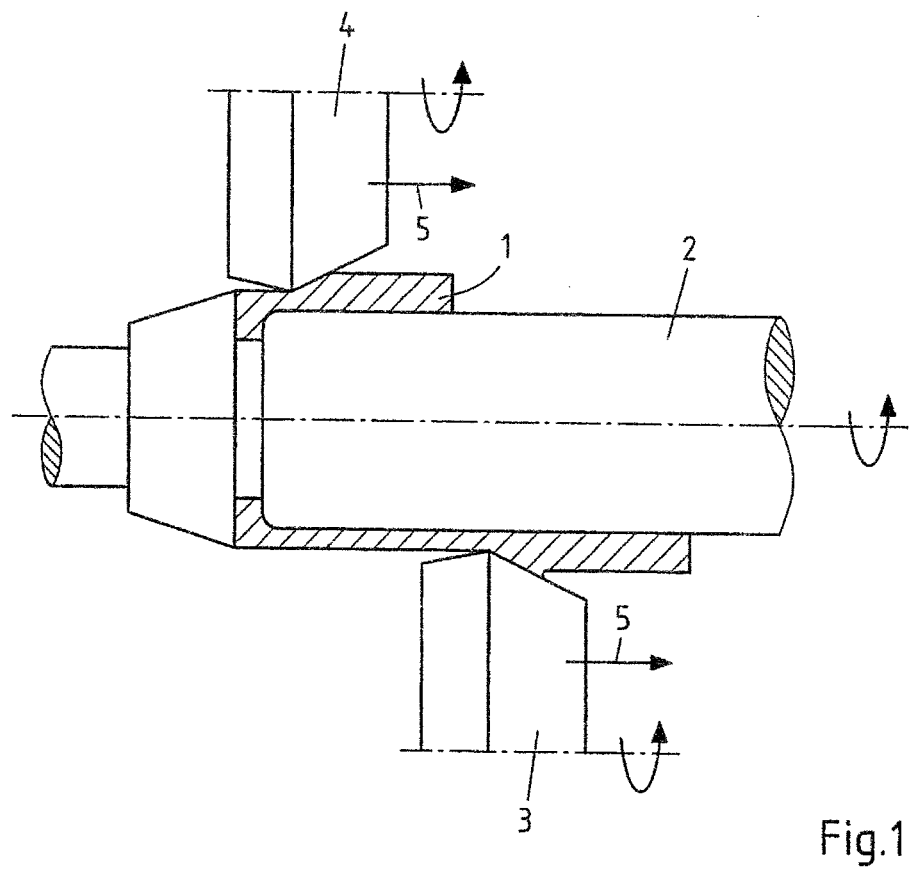
FIG. 1 is a schematic partial cross section view showing an embodiment of the procedure of flow forming or flow turning, as disclosed herein.

According to a first teaching of the present invention, the object presented above is achieved in that a round-plate-like or tubular blank is deformed by flow forming or flow turning to form the connecting element.

It has turned out that, by using flow forming or the flow turning, it is possible not only to produce the complex geometry of the connecting element with high precision. The wall thickness can be reduced to the technically required minimum, and therefore a significant saving on weight is achieved. It has also turned out that the method can be carried out with a high degree of automation and at the same time provides enormous flexibility in respect of the configuration of the connecting element. During flow forming or flow turning, the round-plate-like or tubular blank is set into rotation and deforms by compression by spinning tools rotating simultaneously. The spinning tools can also lead here to a significant surface enlargement and to flowing of the material. Flow turning therefore differs from flow forming merely in that the degrees of deformation are significantly greater during flow turning than during flow forming. Although the present patent application differentiates between flow forming and flow turning, the transitions between the two methods are smooth. Furthermore, of course, a combination of flow forming together with flow turning for producing the connecting element from a round-plate-like or tubular blank is conceivable. This combination is intended to be included with the or linkage of the two method steps.

According to a first embodiment of the method according to the invention, radially encircling regions with a wall thickness varying in the longitudinal direction are produced in the connecting element using flow forming or flow turning. Hereby it is possible to configure the wall thickness of the connecting element, i.e. the wall thickness of the joint outer part or flange and of the connecting pin to suit the load. Via the production method, i.e. the use of flow forming or flow turning, the wall thickness can be varied specifically to the load situation at the respective point of the connecting element, and therefore a connecting element which is even further weight-optimized can be produced.

According to a further embodiment, a particularly good use of material is achieved in that a round-plate-like or tubular blank is deformed to form the connecting element, which blank has a substantially identical material volume as the connecting element. In this case, the material consumption during the production of the connecting element is particularly low.

According to a further embodiment of the method according to the invention, a hollow connecting pin is produced from the blank using flow forming or flow turning. A hollow connecting pin already provides a significant reduction in weight in comparison to connecting pins made from solid material.

Functional elements of the connecting element, in particular toothings, ball raceways, a cage raceway, ABS rings, securing grooves, flanges and/or threads of the connecting element are produced in the blank using flow forming or flow turning. Toothings can be produced at any point of the connecting element by rotating spinning tools, for example eccentrically rotating spinning tools. The same is also true for the provision of ball raceways, cage raceways, ABS rings, securing grooves, joint outer parts, flanges or threads. There is also the possibility of producing other functional elements by the use of flow forming or flow turning in the connecting element.

For example, according to a further exemplary embodiment of the method according to the invention, the toothing of the ABS rings is introduced using flow forming or flow turning.

If the flow forming and/or flow turning working steps are carried out in a single working station with alternating flow forming or flow turning tools, a particularly cost-effective and automated production of the connecting elements is possible.

Finally, there is the possibility of deforming the connecting element, which is produced from the round-plate-like or tubular blank, to form a pivot pin of a tripod joint. For this purpose, further method steps are generally necessary. The latter are preferably carried out in the same working station.

According to a second teaching of the present invention, the object presented above is achieved by a connecting element in that the joint outer part or flange has radially circumferential regions with a wall thickness varying in the longitudinal direction. A correspondingly configured connecting element can have in particular a wall thickness which is configured to suit the load, and therefore the weight of said connecting element can be optimally adapted to the loads. This realizes a considerable weight saving potential, which leads, for example in the case of motor vehicles, to the reduction in fuel consumption. At the same time, with the connecting element according to the invention, the torque of inertia of, for example, articulated shafts can be further reduced because of the reduced masses without reducing the stiffness of the connecting element.

According to a further embodiment of the connecting element according to the invention, a hollow connecting pin, at least one toothing, ball raceways, a cage raceway, ABS rings, flanges, joint outer parts, securing grooves and/or threads are provided preferably produced by using flow forming or flow turning. As already explained previously, the functional elements produced by the use of flow forming or flow turning can be provided in a simple manner, and therefore the costs of the connecting element according to the invention are particularly low. At the same time the use of flow forming or flow turning enables enormous flexibility in respect of the design of functional elements and automated manufacturing.

Finally, according to a further embodiment of the connecting element, that end of the connecting element which is opposite the connecting pin has a radially circumferential material thickened portion. In addition, threaded bores which are distributed uniformly in a radially circumferential manner can optionally be provided at this end of the connecting element. Via the material thickened portion provided on the flange side at that end of the connecting element which is opposite the connecting pin, the stability in the connecting region of the flange can be greatly improved, and therefore a specific wall thickness is provided corresponding to the load of the flange. This also enables a simple arrangement of threaded bores, which are distributed uniformly in a radially circumferential manner, in this region, since sufficient material is provided for a stable screw connection. In addition to the mechanically releasable variant, an integrally bonded (welding) connection is also conceivable in this region.

The present disclosure will be explained in more detail below with reference to exemplary embodiments in conjunction with the accompanying drawing figures.

FIG. 1 now shows, in a schematic diagram, the procedure of flow forming or flow turning of a tubular blank 1 which can be provided, for example, via a round plate or a tube segment. The internal mandrel 2 predetermines the outer shape onto which the likewise rotating spinning tools 3, 4, only half of which is in each case illustrated, press the blank. The spinning tools 3, 4 are advanced here in the advance direction 5 and are displaced, for example, in a manner corresponding to the contour of the mandrel 2 such that the blank 1 is correspondingly deformed.

On the basis of this production principle, it is easily conceivable that any rotationally symmetrical shapes, in particular material thickened portions provided in a radially circumferential manner and tapered portions can be produced via the spinning tools 3, 4 illustrated in FIG. 1. Any other shapes can be produced in the blank by compression via eccentrically rotating tools which can be used instead of the spinning tools 3, 4.

Figure 2:
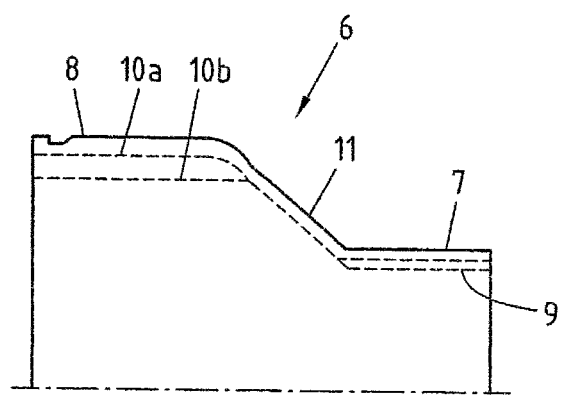
FIGS. 2 through 7 are partial side profile views of embodiments of connecting elements of the present disclosure.

For example, FIG. 2 shows a first exemplary embodiment of a connecting element 6 according to the invention which has a connecting pin 7, in the form of an articulated shaft connecting pin, and a joint outer part 8. The connecting pin 7 has a toothing 9, of which only a single recess is illustrated in the connecting pin 7 in FIG. 2. The same also applies for the joint outer part 8. The joint outer part 8 generally has a plurality of ball raceways and a cage raceway 10a, 10b. In turn, only one ball raceway 10a is illustrated in FIG. 2. The transition region 11 between the connecting pin 7 and the joint outer part 8 of the pivot pin 6 can be optimally configured in respect of the wall thickness, i.e. to be as thin as possible, with the method according to the invention in order to obtain a reduction in weight. The weight of the joint outer part is thereby significantly reduced. The torques of inertia are also significantly reduced because of the reduced masses.

Figure 3:
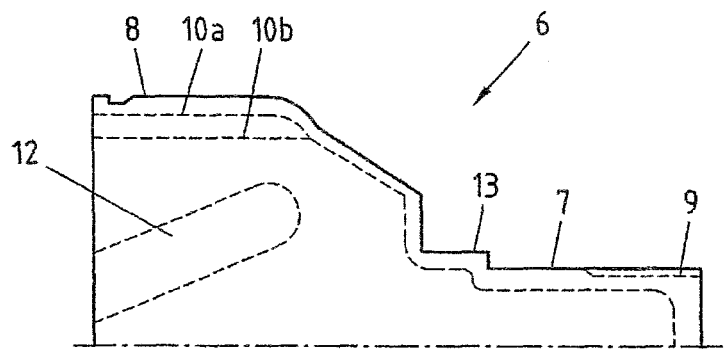

Which functional elements a connecting element according to the invention can furthermore have is illustrated schematically in FIG. 3. Due to the symmetry of the connecting element 6, only one half of the rotationally symmetrical connecting element 6 is in each case shown. In the connecting element 6 illustrated in FIG. 3, ball raceways 12 running exemplary oblique and of which, for example, six or eight are customarily provided, are illustrated. The ball raceways 12 are molded into the joint outer part 8 of the connecting element 6 likewise by flow forming and/or flow turning and can be produced with high precision. The wall thickness in the region of the transition between connecting pin and joint outer part is in turn also formed minimally here in order to reduce the weight of the connecting element. At the same time, it can be seen that the connecting pin 7 (joint connecting pin) is of hollow design in FIG. 3 and has toothings 9 and abrupt changes in thickness 13.

Figure 4:
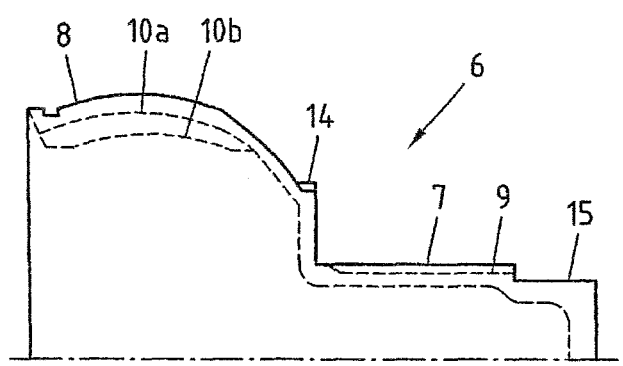

The next exemplary embodiment of a connecting element 6 according to the invention in FIG. 4 has a connecting pin 7 (joint connecting pin) which, firstly, has a toothing 9 and, furthermore, has a thread 15 produced by flow forming or flow turning at the end of the connecting pin 7. The connecting pin 7 itself is again of hollow design here and has an ABS ring 14 in the transition region to the joint outer part 8. The ball raceways 10a and cage raceway 10b have likewise been produced using flow forming or flow turning.

Figure 5:
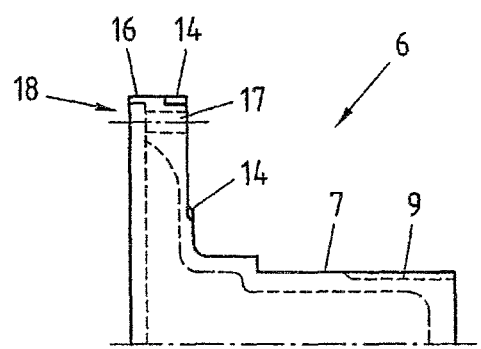

In the next exemplary embodiment, which is illustrated in FIG. 5, of a connecting element 6 according to the invention, a material thickened portion 16 is provided radially on the outside at that end of the connecting element 6 which is opposite to the connecting pin 7, said material thickened portion being designed as a flange 18 in order to arrange threaded bores in an circumferential manner in this region. The connecting pin 7 is designed here as a joint connecting pin. Hereby a simple connection to a rotary spindle is achieved. In the present exemplary embodiment, the ABS ring 14 is arranged at that end of the connecting element 6 which is opposite the connecting pin 7. Furthermore, an alternative position of the ABS ring 14 at the transition region to the flange is indicated. In addition, shown in FIG. 5, that the wall thickness of the connecting element 6 is specifically matched to the loads in the respective region and varies in the longitudinal direction.

Figure 6:
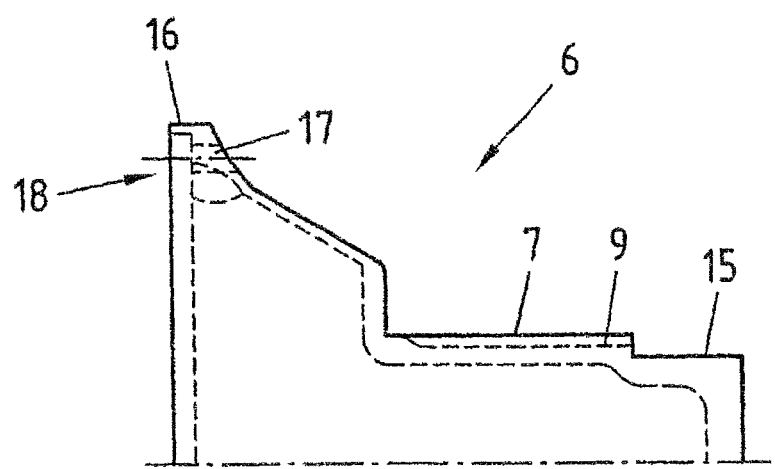
Figure 7:
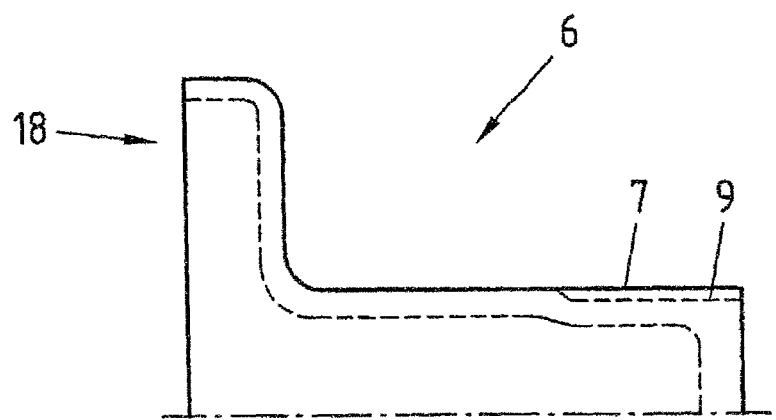

This is also true of the exemplary embodiment from FIG. 6, which has a material accumulation 16 at the end opposite to the connecting pin 7, and threaded bores are additionally provided in this region. The connecting pin 7 is designed here in the form of a profiled shaft connecting pin. The toothing 9 of the connecting pin 7 can likewise be produced in a simple manner in the component by flow forming or flow turning. The same also applies to the thread 15 which is also provided in the embodiment from FIG. 6. The exemplary embodiment illustrated in FIG. 7 does not provide any bore on the flange side 18 for the mechanical connection of further components, but rather is provided in the form of a weld-on flange for the integrally bonded connection of, for example, profiled shafts or Cardan shafts for ball and socket joints. FIGS. 5 and 6 also share the feature that the connecting pin 7 is of hollow design. All of the working steps, apart from the threaded bores, can be customarily realized in a flow forming or flow turning apparatus, and therefore highly automated manufacturing is realized. To this end, flow forming or flow turning enables the material thickness in the finished part to be just 1.5 mm to 2 mm or less in specific regions such that said regions are readily matched to the loads.

The invention claimed is:

1. A method for producing a connecting element for transmitting rotational movements for an articulated shaft, wherein the connecting element has a joint outer part or flange and a connecting pin, the method comprising deforming a round-plate-like or tubular blank by flow forming or flow turning to form the connecting element, wherein the deformation of the round-plate-like or tubular blank comprises producing a ball raceway and a cage raceway in the round-plate-like or tubular blank by flow forming or flow turning, wherein the method further comprises producing radially circumferential regions with a wall thickness that varies in a longitudinal direction in the connecting element using flow forming or flow turning, wherein the connecting pin is hollowed using flow forming or flow turning, wherein the round-plate-like or tubular blank has a first material volume and the connecting element has a second material volume, wherein the first material volume is substantially identical to the second material volume.

2. The method of claim 1, wherein deformation of the round-plate-like or tubular blank by flow forming or flow turning is performed with alternating flow forming or flow turning tools.

3. A method for producing a connecting element for transmitting rotational movements for an articulated shaft, wherein the connecting element has a joint outer part or flange and a connecting pin, the method comprising deforming a round-plate-like or tubular blank by flow forming or flow turning to form the connecting element, wherein the deformation of the round-plate-like or tubular blank comprises producing a ball raceway and a cage raceway in the round-plate-like or tubular blank by flow forming or flow turning, wherein the method further comprises producing radially circumferential regions with a wall thickness that varies in a longitudinal direction in the connecting element using flow forming or flow turning, wherein the connecting pin is hollowed using flow forming or flow turning, wherein the flow forming or flow turning working steps are carried out in a single working station.

* * * * *